United States Patent
Chen et al.

(10) Patent No.: US 7,092,338 B2
(45) Date of Patent: Aug. 15, 2006

(54) METHOD AND APPARATUS FOR CONTROLLING LASER BEAM POWER IN AN OPTICAL RECORDING SYSTEM

(75) Inventors: Chih-Yuan Chen, Changhua Hsien (TW); Jin-Chuan Hsu, Hsinchu Hsien (TW)

(73) Assignee: MediaTek Inc., HsinChu Hsien (TW)

( * ) Notice: Subject to any disclaimer, the term of this patent is extended or adjusted under 35 U.S.C. 154(b) by 589 days.

(21) Appl. No.: 10/286,234

(22) Filed: Oct. 31, 2002

(65) Prior Publication Data
US 2003/0185127 A1   Oct. 2, 2003

(30) Foreign Application Priority Data
Mar. 29, 2002  (TW) ................ 91106380 A

(51) Int. Cl.
*G11B 7/00* (2006.01)
(52) U.S. Cl. .................... 369/53.27; 369/53.3
(58) Field of Classification Search ...... None
See application file for complete search history.

(56) References Cited

U.S. PATENT DOCUMENTS

| | | | |
|---|---|---|---|
| 5,436,880 A | 7/1995 | Eastman et al. | |
| 5,446,716 A | 8/1995 | Eastman et al. | |
| 5,675,568 A | 10/1997 | Hajjar et al. | |
| 6,052,347 A * | 4/2000 | Miyata | 369/47.53 |
| 6,418,102 B1 * | 7/2002 | Suga | 369/47.53 |

* cited by examiner

*Primary Examiner*—William Korzuch
*Assistant Examiner*—Joseph Haley
(74) *Attorney, Agent, or Firm*—Winston Hsu

(57) ABSTRACT

In a method and apparatus for controlling the power of a laser beam in an optical recording system that includes a laser light source, an optical detector detects a reflected write pulse that is a reflection of an incident recording light signal from the optical recording medium, and a signal generating device generates a mark formation effectiveness (MFE) signal according to the reflected write pulse. A laser power compensation circuit includes a filter for filtering the MFE signal so as to result in a first component, and a combiner for combining the first component and the MFE signal so as to result in a second component. The laser power compensation circuit controls laser beam power of the laser light source according to the first and second components for optimum information recording.

14 Claims, 5 Drawing Sheets

US 7,092,338 B2

METHOD AND APPARATUS FOR CONTROLLING LASER BEAM POWER IN AN OPTICAL RECORDING SYSTEM

CROSS-REFERENCE TO RELATED APPLICATION

This application claims priority of Taiwanese application no. 091106380, filed on Mar. 29, 2002.

BACKGROUND OF THE INVENTION

1. Field of the Invention

The invention relates to a method and apparatus for controlling laser beam power in an optical recording system, more particularly to a method and apparatus for optimal control of the power of a recording laser beam.

2. Description of the Related Art

To record information on an optical recording medium, a light source of an optical recording system, such as a laser read/write head that is driven by a laser driver circuit according to a write control signal, generates an incident recording light signal on the optical recording medium. To assure that data is correctly recorded, it is important that the laser output must be maintained at an appropriate power level. The optimal power control (OPC) technique is widely employed in determining the initial laser power of incident recording light signals. First, an optical recording medium, usually having a section reserved for laser power testing and control adjustment, is provided. Then, a series of laser light signals of different power outputs is irradiated on this section for writing practice records. Afterwards, the practice records are read and analyzed, and the recording power level that yielded the best recording quality is selected as the optimum power level of incident recording light signals for recording on other sections of the optical recording medium. In practice, for most optical recording systems, due to various factors affecting optical recording systems and optical recording media, such as changes in the thickness of recording dye layer and substrate characteristics of optical recording media, changes in recording points due to shifting in laser wavelength, the spatial position relationship of recording media with respect to the optical recording system, changes in recording characteristics of recording media due to temperature variations, etc., the optimum power level for generating the best incident recording light signal is prone to vary as well. There is thus an urgent need for a method and apparatus for the optimal control of the power of a recording laser beam in an optical recording system that can compensate the adverse effects of the aforesaid various factors.

SUMMARY OF THE INVENTION

Therefore, the object of the present invention is to provide a method and apparatus for controlling the power of a laser beam in an optical recording system that can overcome the aforesaid drawbacks associated with the prior art.

According to one aspect of the present invention, there is provided a method for controlling the power of a laser beam in an optical recording system that includes a laser light source. The laser light source is operable so as to provide an incident recording light signal for recording information on an optical recording medium. The method comprises the steps of:

a) detecting a reflected write pulse that is a reflection of the incident recording light signal from the optical recording medium;

b) generating a mark formation effectiveness (MFE) signal according to the reflected write pulse obtained in step a), the MFE signal corresponding to the information recorded on the optical recording medium; and c) controlling laser beam power of the laser light source according to the MFE signal obtained in step b) for optimum information recording, including the sub-steps of c-1) filtering the MFE signal to result in a first component, c-2) combining the first component and the MFE signal to result in a second component, and c-3) controlling the laser beam power of the laser light source according to the first and second components.

According to another aspect of the present invention, there is provided an apparatus for controlling the power of a laser beam in an optical recording system that includes a laser light source. The laser light source is operable so as to provide an incident recording light signal for recording information on an optical recording medium. The apparatus comprises:

an optical detector adapted for detecting a reflected write pulse that is a reflection of the incident recording light signal from the optical recording medium;

a signal generating device coupled to the optical detector and generating a mark formation effectiveness (MFE) signal according to the reflected write pulse, the MFE signal corresponding to the information recorded on the optical recording medium; and a laser power compensation circuit coupled to the signal generating device and adapted to be coupled to the laser light source, the laser power compensation circuit including a filter for filtering the MFE signal so as to result in a first component, and a combiner coupled to the filter and combining the first component and the MFE signal so as to result in a second component, the laser power compensation circuit being adapted to control laser beam power of the laser light source according to the first and second components for optimum information recording.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
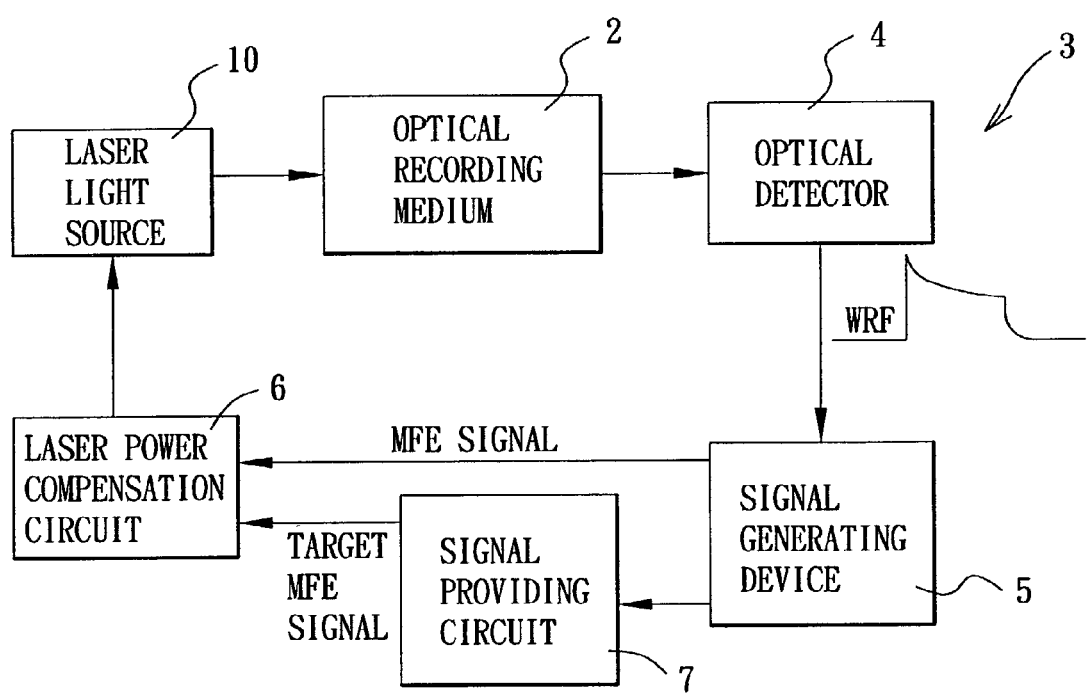
FIG. 1 is a schematic block diagram of an optical recording system that incorporates the preferred embodiment of an apparatus for controlling laser beam power according to the present invention.

FIG. 1 illustrates an optical recording system that incorporates the preferred embodiment of an apparatus 3 for controlling laser beam power according to the present invention. The optical recording system is adapted to be loaded with an optical recording medium 2, and is shown to include a laser light source 10, such as a known laser read/write head, that is operable so as to provide an incident recording light signal for recording information on the optical recording medium 2 in a known manner. The apparatus 3 includes an optical detector 4, a signal generating device 5 for generating a mark formation effectiveness (MFE) signal, and a laser power compensation circuit 6.

The preferred embodiment of the method for controlling the power of the recording laser beam according to this invention will now be described in greater detail in the following paragraphs.

First, the optical detector 4 is disposed on a light reflection path for detecting a reflected write pulse (WRF) that is a reflection of the incident recording light signal from the optical recording medium 2. The reflected write pulse (WRF) includes a portion that corresponds to the recorded information.

Then, the signal generating device 5, which is coupled to the optical detector 4, generates the MFE signal that is based on the reflected write pulse (WRF) and that corresponds to the information recorded on the optical recording medium 2. The MFE signal represents the quality of information recorded on the optical recording medium 2 as detected from the reflected write pulse (WRF). There are many designs of the signal generating device 5 available in the prior art. One such design is taught in a co-pending U.S. patent application entitled "Optical Recording System with Optimal Recording Laser Beam Power Control, and Method and Apparatus for Generating a Mark Formation Effectiveness Signal in an Optical Recording System," which is commonly owned by the applicant.

Figure 2:
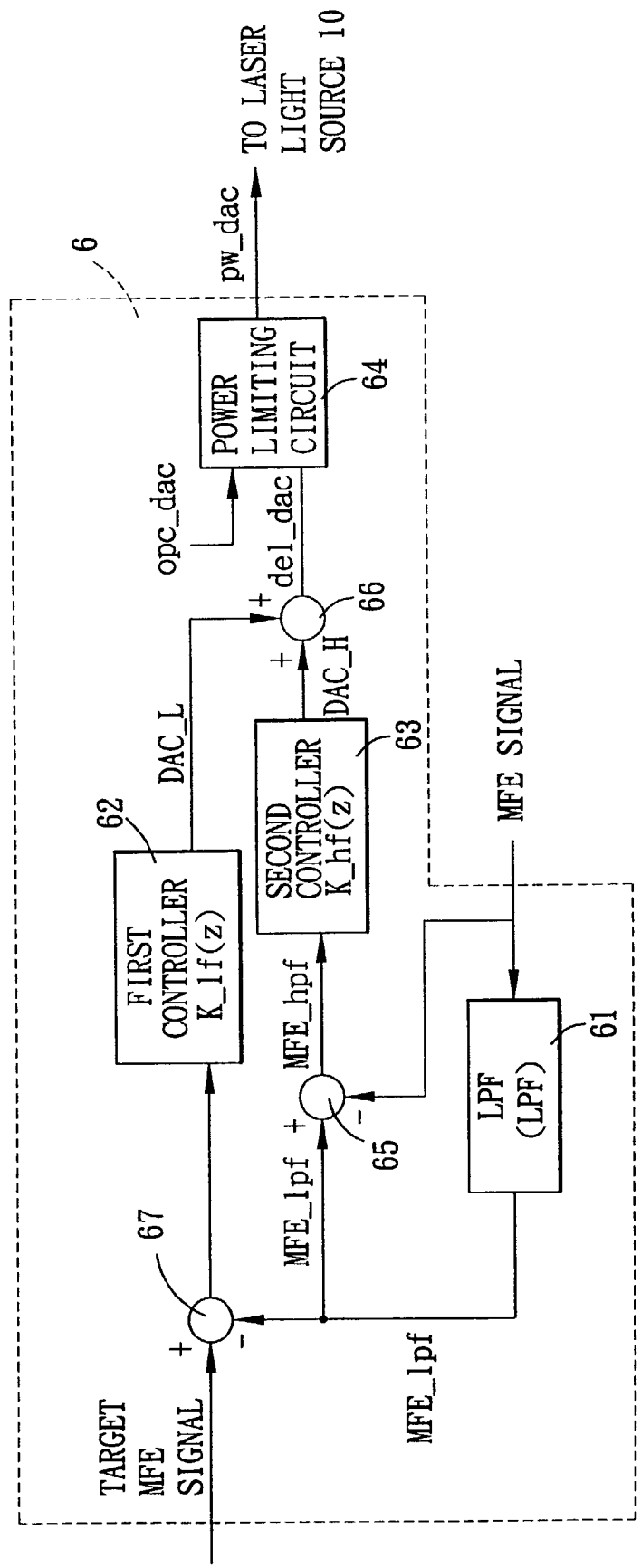
FIG. 2 is a schematic block diagram showing a laser power compensation circuit of the preferred embodiment.

Thereafter, the laser power compensation circuit 6 controls the output power of the laser light source 10 according to the MFE signal. As shown in FIGS. 1 and 2, in this embodiment, the laser power compensation circuit 6 is coupled between the laser light source 10 and the signal generating device 5, and includes a filter 61, a first controller 62, a second controller 63, a power limiting circuit 64, a first combiner 65, a second combiner 67, and a third combiner 66. The filter 61 is a low pass filter (LPF), and receives and filters the MFE signal from the signal generating device 5 so as to result in a first or low frequency component (MFE_lpf) of the MFE signal. Thereafter, the first combiner 65, which is a subtractor that is coupled to the filter 61, combines the first component (MFE_lpf) and the MFE signal from the signal generating device 5 to result in a second or high frequency component (MFE_hpf) of the MFE signal. The first component (MFE_lpf) corresponds to low frequency factors that affect recording quality on optical recording media, such as changes in the thickness of recording dye layer of optical recording media, temperature, and shift of laser wavelength, etc. The second component (MFE_hpf) corresponds to high frequency factors that affect recording quality on optical recording media, such as the spatial position relationship of recording media with respect to the optical recording system, etc.

In order to accurately control the output power of the laser light source 10, the apparatus 3 further includes a signal providing circuit 7 coupled between the signal generating device 5 and the laser power compensation circuit 6 for providing a target MFE signal to the laser power compensation circuit 6. The target MFE signal corresponds to the optimum laser power for yielding the best recording quality. The exact manner of obtaining the target MFE signal depends on the actual recording method performed by the optical recording system. For example, when the optical recording system is a Constant Linear Velocity (CLV) recording system, the signal providing circuit 7 will enable the laser power compensation circuit 6 to operate in a practice mode involving the aforesaid optimal power control (OPC) technique before actual recording. During the practice mode, the laser light source 10 irradiates a section of the optical recording medium 2 that is reserved for laser power testing and control adjustment with a series of laser light signals of different power outputs for writing practice records. The optical detector 4 detects reflected write pulses (WRF) corresponding to the practice records, and the signal generating device 5 generates the MFE signals corresponding to the detected reflected write pulses (WRL). The MFE signals will be received and analyzed by the signal providing circuit 7 to select the MFE signal that is associated with the optimum laser power for yielding the best recording quality and that is set to be the target MFE signal. Actual data recording can begin after the signal providing circuit 7 obtains the target MFE signal, which is maintained throughout subsequent recording on the optical recording medium 2 by the CLV recording system.

Figure 3:
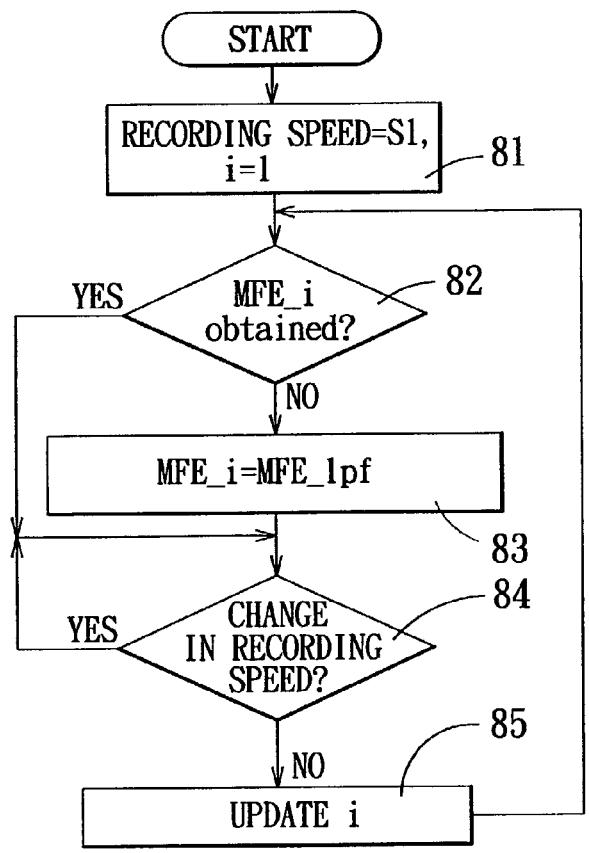
FIG. 3 is a flowchart illustrating how recording proceeds in a zonal constant linear velocity (ZCLV) recording system according to this invention.
Figure 4:
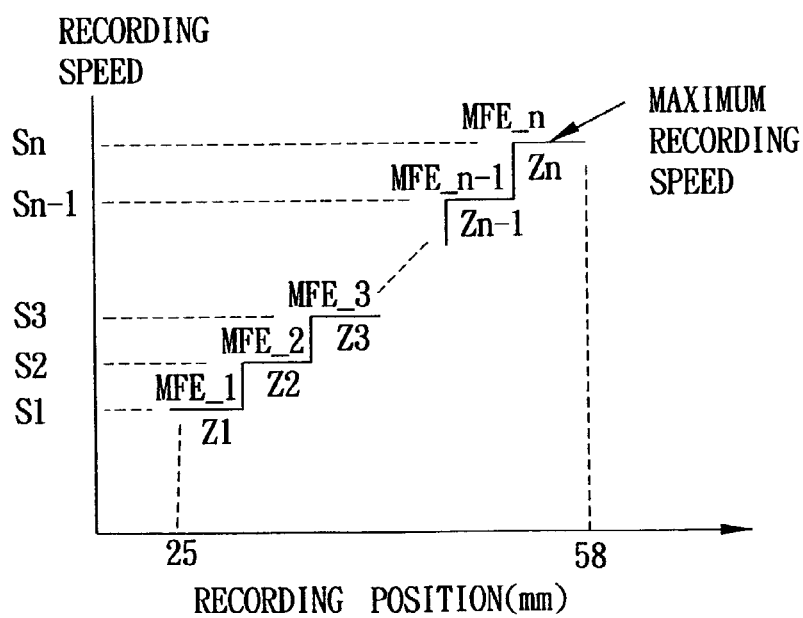
FIG. 4 is a graph showing how a mark formation effectiveness (MFE) signal varies according to the recording speed and position in the ZCLV recording system of this invention.

In another example, the optical recording system may be a Zonal Constant Linear Velocity (ZCLV) recording system. As shown in FIG. 4, when executing ZCLV recording, the recording speed is proportional to a radial distance of the recording position from a center of the optical recording medium 2. Since each zone (Z1, Z2, . . . , Zn) starting from an innermost radial part to an outermost part of the optical recording medium 2 has a different recording speed (S1, S2, . . . , Sn), operation in the practice mode involving the aforesaid OPC technique must be executed before data recording begins for each zone (Z1, Z2, . . . , Zn) so that the signal providing circuit 7 provides different target MFE signals (MFE_1, MFE_2, . . . , MFE_n) for the different recording speeds. The relevant operation is shown in FIG. 3. At step 81, the recording speed is at an initial speed (S1), and a variable (i) is set to 1. Then, at step 82, it is verified whether the target MFE signal (MFE_i) for the zone (Zi) of the optical recording medium 2 has been obtained. In the negative, the flow goes to step 83, where the target MFE signal (MFE_i) is set to be equal to the first component (MFE_lpf) from the low pass filter 61. Otherwise, the flow goes to step 84, where it is determined whether a change in the recording speed has occurred, indicating a change in the recording zone. In the affirmative, the variable (i) is updated at step 85, and the flow goes back to step 82. It is apparent from the foregoing that the signal providing circuit 7 provides increasing values of target MFE signals during ZCLV recording. Therefore, during ZCLV recording, the optical recording system will perform OPC when there is a change in the recording zone so that the signal providing circuit 7 will be able to obtain the target MFE signal for each recording zone through the OPC process. The target MFE signal corresponding to a selected recording zone will be outputted by the signal providing circuit 7 to the laser power compensation circuit 6 when recording data on the selected recording zone.

Referring back to FIGS. 1 and 2, in the laser power compensation circuit 6, the second combiner 67 is in the form of a subtractor that is coupled to the filter 61 and that receives the target MFE signal from the signal providing circuit 7. The second combiner 67 combines the first component (MFE_lpf) from the filter 61 and the target MFE signal from the signal providing circuit 7 to obtain a difference signal that, in turn, is provided to the first controller 62. The first controller 62 is a low frequency controller that generates a first compensation signal (DAC_L) for compensating low frequency factors corresponding to the difference signal based on a first predetermined value obtained through experimentation (for example, a factor of 0.2). On the other hand, the second controller 63, which is coupled to the first combiner 65, is a high frequency controller that generates a second compensation signal (DAC_H) for compensating high frequency factors corresponding to the second component (MFE_hpf) based on a second predetermined value obtained through experimentation (for example, a factor of 0.5). The third combiner 66, such as an adder, is coupled to the first and second controllers 62, 63, and is adapted to be coupled to the laser light source 10 through the power limiting circuit 64. The third combiner 66 combines the first and second compensation signals (DAC_L, DAC_H) to result in a compound compensation signal (del_dac) for controlling the laser beam power of the laser light source 10.

Figure 5A:
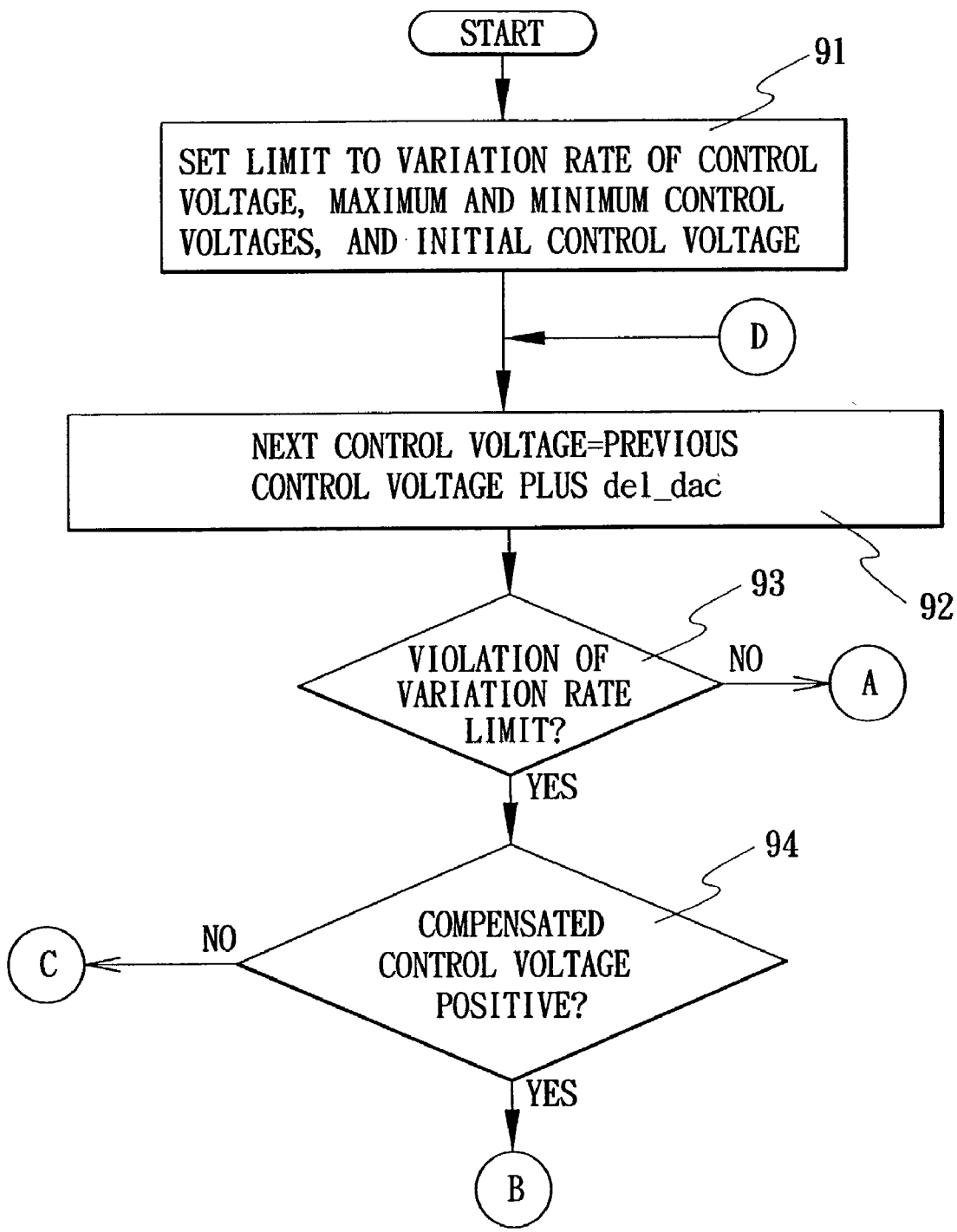
FIGS. 5A and 5B are flowcharts that illustrate the operation of a power limiting circuit of the laser power compensation circuit of FIG. 2.
Figure 5B:
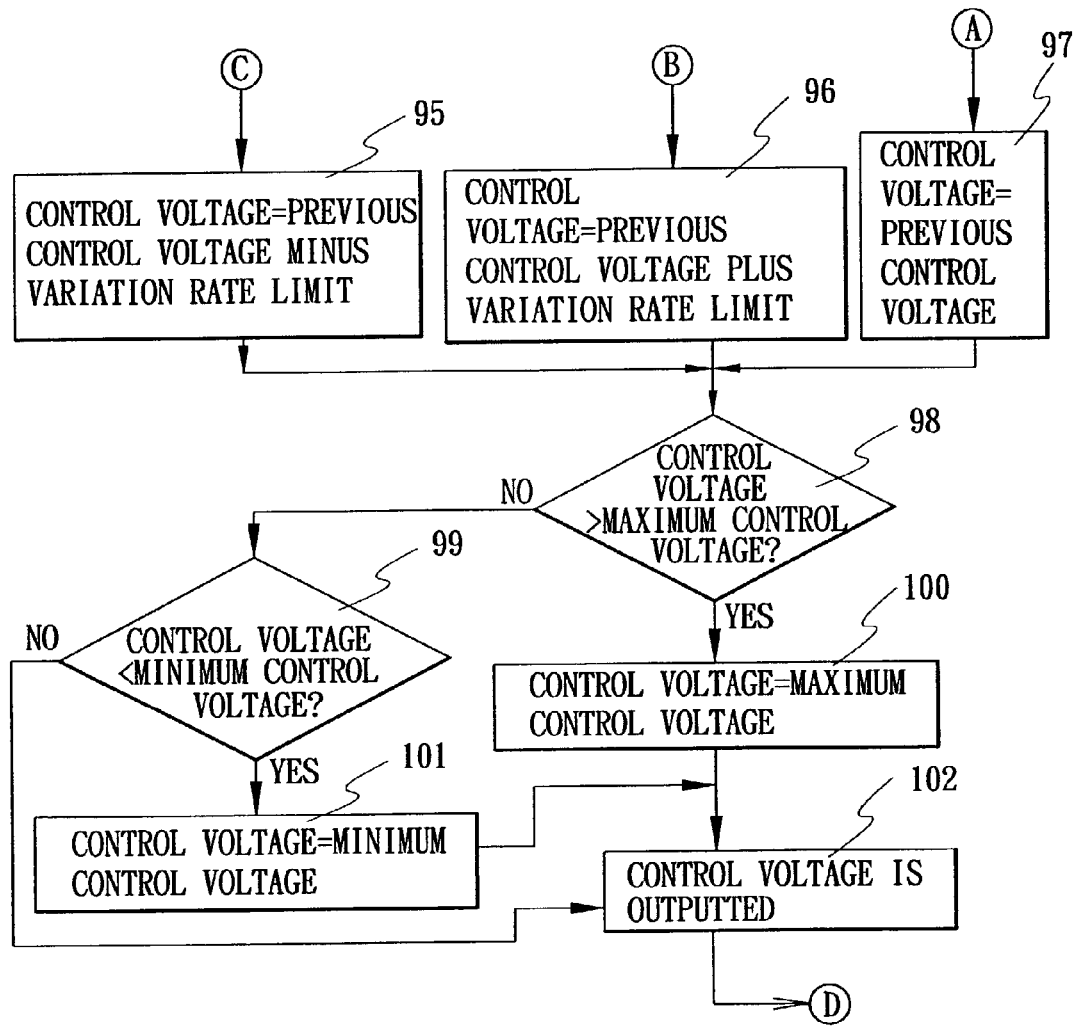

Moreover, in order to protect the optical recording system and prevent erroneous operation, the compound compensation signal (del_dac) is received by the power limiting circuit 64 that is coupled to the laser light source 10 and that further receives an optimal power signal (opc_dac) obtained during the aforesaid OPC operation so as to limit the variation rate and magnitude of the control voltage that is provided to the laser light source 10. The relevant operation is shown in FIGS. 5A and 5B. First, at step 91, parameters, including a limit to the variation rate of the control voltage, the maximum and minimum control voltages, the initial control voltage, etc., are set according to an optimum power control voltage found through the OPC operation. Then, at step 92, the compound compensation signal (del_dac) is obtained from the laser power compensation circuit 6, and the next control voltage is set as the previous control voltage plus the compound compensation signal (del_dac). Thereafter, at step 93, it is determined whether the compensated control voltage violates the limit to the variation rate. In the affirmative, the flow goes to step 94. Otherwise, the flow goes to step 97. At step 94, it is determined whether the compensated control voltage is positive. In the affirmative, the flow first goes to step 95, where the control voltage is set as the previous control voltage minus the limit to the variation rate, and then to step 98. Otherwise, the flow first goes to step 96, where the control voltage is set as the previous control voltage plus the limit to the variation rate, and then to step 98. At step 97, the control voltage is set as the previous control voltage. Then, the flow goes to step 98. At step 98, it is determined whether the control voltage is greater than the maximum control voltage. In the affirmative, the flow goes to step 100. Otherwise, the flow goes to step 99. At step 100, the control voltage is set to the maximum control voltage. The flow then goes to step 102. At step 99, it is determined whether the control voltage is less than the minimum control voltage. In the affirmative, the flow goes to step 101. Otherwise, the flow goes to step 102. At step 101, the control voltage is set to the minimum control voltage. Thereafter, the flow goes to step 102, where the control voltage is outputted, and then back to step 91. As evident from FIGS. 5A and 5B, by limiting the variation rate and magnitude of the control voltage, the output power of the laser light source 10 can be limited to be within a reliable range to avoid poor recording quality, to protect the laser light source 10, and to prevent erroneous operation.

In summary, in the method and apparatus of this invention, a CLV or ZCLV optical recording system can first obtain reflected write pulses (WRF) generated from incident recording light signals (IRL) through the optical detector 4. The reflected write pulses (WRF) are subsequently received by the signal generating device 5 so as to generate MFE signals that represent recording quality. The MFE signals and a target MFE signal are then sent to the laser power compensation circuit 6. In the laser power compensation circuit 6, the MFE signal is separated into high and low frequency components that control generation of first and second compensation signals by the first and second controllers 62, 63. The first and second compensation signals are subsequently used in the generation of a control voltage for the laser light source 10, whereby the aforesaid high and low frequency factors that affect recording quality are adequately compensated for optimum recording laser beam power control and improved recording quality. Furthermore, since the power limiting circuit 64 limits the variation rate and magnitude of the control voltage, the output power of laser light source 10 is limited to be within a safe range to avoid poor recording quality, and to protect the laser light source 10 from overdrive and erroneous operation due to extraneous interference or defects in the optical recording medium 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method for controlling the power of a laser beam in an optical recording system that includes a laser light source, the laser light source being operable so as to provide an incident recording light signal for recording information on an optical recording medium, said method comprising the steps of:
   a) detecting a reflected write pulse that is a reflection of the incident recording light signal from the optical recording medium;
   b) generating a mark formation effectiveness (MFE) signal according to the reflected write pulse obtained in step a), the MFE signal corresponding to the information recorded on the optical recording medium;
   c) filtering the MFE signal obtained in step b) to result in a first component;
   d) combining the first component and the MFE signal obtained in step b) to result in a second component;
   e) combining the first component and a target MFE signal to result in a difference signal; and
   controlling laser beam power of the laser light source according to the second component obtained in step d) and the difference signal obtained in step e) for optimum information recording:
   wherein step f) comprises the sub-steps of:
   f-1) generating a first compensation signal based on the difference signal, and a second compensation signal based on the second component;
   f-2) combining the first and second compensation signals to result in a compound compensation signal for controlling the laser beam power of the laser light source; and
   f-3) generating a control voltage from the compound compensation signal, and limiting a variation rate and magnitude of the control voltage that is provided to the laser light source to protect the laser light source.

2. The method as claimed in claim 1, wherein in step c), the MFE signal is filtered by a low pass filter such that the first component is a low frequency component of the MFE signal and such that the second component obtained in step d) is a high frequency component of the MFE signal.

3. The method as claimed in claim 1, wherein the MFE signal represents the quality of the information recorded on the optical recording medium by the incident recording light signal.

4. The method as claimed in claim 1, wherein the target MFE signal corresponds to the optimum laser power for yielding the best recording quality.

5. The method as claimed in claim 4, wherein the target MFE signal is determined by irradiating the optical recording medium with a series of laser light signals having different power outputs for writing practice records that are subsequently analyzed to determine the optimum laser power.

6. The method as claimed in claim 5, wherein the optical recording system is a constant linear velocity recording system.

7. The method as claimed in claim 5, wherein the optical recording system is a zonal constant linear velocity recording system, and the target MFE signal is adjusted according to actual recording speed during zone recording of the optical recording medium.

8. An apparatus for controlling the power of a laser beam in an optical recording system that includes a laser light source, the laser light source being operable so as to provide an incident recording light signal for recording information on an optical recording medium, said apparatus comprising:
   an optical detector adapted for detecting a reflected write pulse that is a reflection of the incident recording light signal from the optical recording medium;
   a signal generating device coupled to said optical detector and generating a mark formation effectiveness (MFE) signal according to the reflected write pulse, the MFE signal corresponding to the information recorded on the optical recording medium; and
   a laser power compensation circuit including
      a filter coupled to said signal generating device and filtering the MFE signal from said signal generating device to result in a first component,
      a first combiner coupled to said filter and said signal generating device and combining the first component from said filter and the MFE signal from said signal generating device to result in a second component,
      a second combiner coupled to said filter and combining the first component from said filter and a target MFE signal to result in a difference signal,
      a first controller coupled to said second combiner for generating a first compensation signal based on the difference signal,
      a second controller coupled to said first combiner for generating a second compensation signal based on the second component, and
      a third combiner coupled to said first and second controllers and adapted to be coupled to the laser light source, said third combiner combining the first and second compensation signals to result in a compound compensation signal for controlling the laser beam power of the laser light source.
   wherein said first and second controllers being adapted to be coupled to the laser light source and cooperating to control laser beam power of the laser light source according to the second component obtained from said first combiner and the difference signal obtained from said second combiner for optimum information recording; and said laser power compensation circuit further includes a power limiting circuit coupled to said third combiner and adapted to be coupled to the laser light source, said power limiting circuit generating a control voltage from the compound compensation signal, and limiting a variation rate and magnitude of the control voltage that is to be provided to the laser light source to protect the laser light source.

9. The apparatus as claimed in claim 8, wherein said filter is a low pass filter, said first controller is a low-frequency controller, said second controller is a high-frequency controller, the first component is a low frequency component of the MFE signal, and the second component is a high frequency component of the MFE signal.

10. The apparatus as claimed in claim 8, wherein the MFE signal represents the quality of the information recorded on the optical recording medium by the incident recording light signal.

11. The apparatus as claimed in claim 8, further comprising a signal providing circuit coupled to said second combiner and providing the target MFE signal thereto, the target MFE signal corresponding to the optimum laser power for yielding the best recording quality.

12. The apparatus as claimed in claim 11, wherein said signal providing circuit is further coupled to said signal generating device and enables operation of said laser power compensation circuit in a practice mode, during which the laser light source irradiates the optical recording medium with a series of laser light signals having different power outputs for writing practice records that are subsequently analyzed by said signal providing circuit in conjunction with said optical detector and said signal generating device to determine the optimum laser power.

13. The apparatus as claimed in claim 12, wherein the optical recording system is a constant linear velocity recording system.

14. The apparatus as claimed in claim 12, wherein the optical recording system is a zonal constant linear velocity recording system, and said signal providing circuit adjusts the target MFE signal according to actual recording speed during zone recording of the optical recording medium.

* * * * *